Patented Aug. 2, 1949

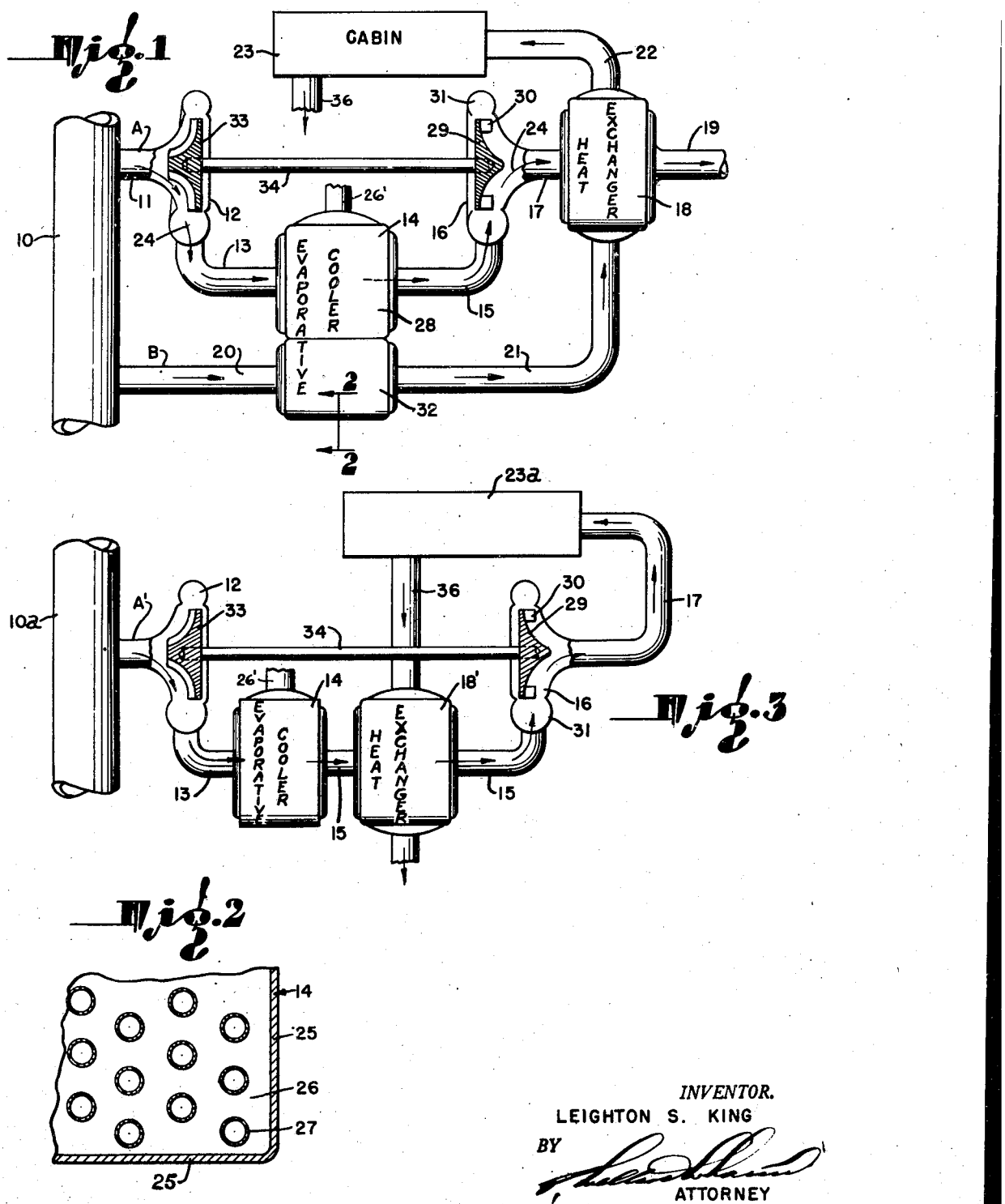

2,477,932

UNITED STATES PATENT OFFICE 2,477,932

AIRCRAFT EVAPORATIVE COOLING SYSTEM

Leighton S. King, Los Angeles, Calif., assignor to The Garrett Corporation, Los Angeles, Calif., a corporation of California Application January 6, 1947, Serial No. 720,396

7 Claims. (Cl. 62—138)

My invention relates to cooling systems for aerial vehicles, and though the preferred embodiments of the invention herein presented are especially suited for use in high speed aircraft, such as interceptor planes, it is susceptible of advantageous use in other types of aerial vehicles, such as rockets and guided missiles.

It is an object of the invention to provide a simple and effective means for cooling the cabins, compartments, control instruments, etc. of aerial vehicles which are operated in the supersonic range. Within the meaning of the term "aerial vehicle" I include airborne craft, rockets, and projectiles. Mechanically and/or rocket driven aircraft designed to attain speeds in the lower supersonic range are in flight subjected to high temperatures, the result being that without effective cooling means, the temperatures in the cabins or cockpits of these airplanes are greatly in excess of human endurance. The present invention provides a simple cooperative arrangement of elements for use on aircraft of this type whereby the temperatures of selected parts of the aircraft— for example, cockpits, cabins, and instrument compartments—may be maintained at suitable low values. In rockets and guided missiles attaining speeds of 3000 to 4000 miles per hour, entering air temperatures may be in the range of 2800° F. It is quite evident that ordinary cooling systems, for example, those wherein compressed air is cooled by passing it in heat exchange relation to ambient air, are ineffective when used on aerial vehicles of this type. Instruments for directional control and other functions are affected or rendered inoperative by excessively high temperatures, and therefore it is imperative that cooling means be employed in aerial vehicles using such instruments. My present invention provides a satisfactory means for maintaining low temperatures for periods of time at least as long as the time required for the flight of rockets and missiles.

It is an object of the invention to provide a cooling device characterized by the combined use of an evaporative cooler which accomplishes cooling of a flow of a gaseous medium, such, for example, as air which has entered the aerial vehicle through a suitable induction passage, and a work extraction means, such as an engine which is driven by the gaseous medium and extracts heat from the gaseous medium in the form of heat energy expended in the driving of the engine.

A further object of the invention is to provide a device of the character set forth in the preceding paragraph, wherein the power developed by the engine in the extraction of heat energy or work from the gaseous medium is employed for the purpose of applying a motivating force to the gaseous medium to assist in the movement of the gaseous medium through the path of movement defined in the aerial vehicle for the flow of the gaseous medium from the source thereof to the point of ultimate disposition, to which the gaseous medium, in cooled state, is delivered. In the practice of the invention, the point of ultimate disposition of the gaseous medium may be a cockpit, cabin, instrumentality or other means arranged to use the cooling effect or other functional characteristic of the gaseous medium.

The invention comprehends a cooling system of the character described herein having evaporative cooling means in the path of flow of the air or other gaseous medium to be cooled, this evaporative cooling means being characterized by having a substance which, by its evaporation, cools the air or other gaseous medium. In the simple embodiment of the invention herein disclosed the substance employed for this purpose is water.

Further objects and advantages of the invention may be brought out in the following part of the specification, wherein detailed description has been employed in the disclosure of preferred embodiments of the invention without placing limitations on the scope thereof set forth in the appended claims.

Referring to the drawings which are for illustrative purposes only:

Fig. 1 is a schematic view showing a preferred form of the invention.

Fig. 2 is an enlarged fragmentary sectional view, taken as indicated by the line 2—2 of Fig. 1.

Fig. 3 is a schematic view showing another form of cooling device in which the invention may be advantageously practiced.

In the form of the invention disclosed in Fig. 1, a source of air under pressure is provided. This source of air under pressure is disclosed as an air duct 10 in which a suitably high pressure is produced, either by ram effect or by use of air compressing means such, for example, as those employed for the feeding of air to jet engines. Two paths of flow for air from the duct 10 are provided. The first path of flow A includes duct 11, air motivating means or booster compressor 12, duct 13, a portion of an evaporative cooler 14, duct 15, heat extraction engine 16, one of the passes for air through a heat exchanger 18, and a discharge duct 19. The second path of flow B includes duct 20, a portion of the evaporative cooler 14, duct 21, the second pass for the flow of air through the heat exchanger 18, duct 22, and cabin or compartment 23 having an air outlet 36. The cabin 23 represents any receiver for the cooled air which is the product of the cooling device.

Air received under pressure from the air duct 11 follows a course through the duct 10 by the duct 11 indicated by the arrows 24. The path of flow A indicated by the arrows 24. The motivating means 12, shown as a centrifugal blower, urges the air through the evaporative cooler 14 wherein it is cooled to a temperature determined by the boiling point of the water in the evaporative cooler 14. As shown in Fig. 2, this evaporative cooler 14 has a water vapor outlet 26' and walls 25 forming a chamber 26 traversed by tubes 27 forming passages for the flow of air in the path of flow A from the inlet to the outlet of the upper section 28 of the evaporative cooler 14. The space in the chamber 26, surrounding the tubes 27, is filled with water, and heat from the air passing through the tubes 27 is conducted through the walls of the tubes 27, causing the water in the chamber 26 to boil, thereby causing the water to evaporate by internal vaporization instead of mere surface vaporization. Also, the evaporative cooler is arranged so that none of the water vapors are entrained in the air flowing through path A.

From the outlet of the upper section 28 of the evaporator cooler 14, the cooled air passes into the heat extraction engine, which is shown as a turbine having a rotor 29 equipped with blades or vanes 30, arranged to be driven by the air in its passage radially inwardly from the peripheral chamber 31 of the turbine 16. The air, cooled to a suitably low temperature as the result of the extraction of work therefrom by the engine 16, and further as the result of expansion, is carried through the duct 17 and through one of the passes of the heat exchanger 18 to the discharge duct 19. Insofar as the path of flow A is concerned, the heat exchanger 18 may be regarded as the point of ultimate disposition of the cooled air, for the reason that in the heat exchanger 18 the air cooled as the result of its movement through the path of flow A is employed for its intended purpose. Therefore, the heat exchanger 18 is representative of any receiver wherein or by which the useful functions of the air of the path of flow A are utilized. The air which moves from the air duct 10 through the path of flow B to the cabin 23 is first cooled by its passage through the lower section 32 of the evaporative cooler 14, and then is further cooled by being conducted in heat transfer relation to the cooled air of the path of flow A in the heat exchanger 18. However, the air in the path of flow B has not been materially reduced in pressure by its passage through the cooling means represented by the parts 32 and 18, and therefore may be employed to pressurize the cabin 23. The power recovered by the rotor 29 of the heat extraction engine 16 is usefully employed in driving the impeller 33 of the air motivating means or centrifugal blower 12. Indicative of this, I have shown the rotor 29 and the impeller 33 fixed on an interconnecting shaft 34.

As illustrated in Fig. 1, some conditions under which the invention is used require that a second flow of air, for example, through a path of flow B, be conducted in heat exchange relation to the main flow of air through the path of flow A, in order to obtain a desired pressure in the cooled air fed to the cabin 23. The reason for this is that in absorbing heat energy or work from the flow of air in the path A, the heat extraction engine 16 produces a material reduction in the air pressure, so that in many instances, the cooled air fed by the engine 16 into the duct 17 is at a pressure below that desired for the interior of the cabin 23. There are other usages for the invention, however, as illustrated in Fig. 3, wherein the single path of flow of air A' may be suitably employed, omitting the second path of flow B. One of these conditions is where only a relatively low pressure is required in a compartment 23a. Another condition is where the pressure of air in the source represented by the duct 10a is of such high value that the pressure of the air in the path of flow A', Fig. 3, after its passage through the work extraction engine 16, will be at least as great as such higher pressure as may be required in the compartment 23a.

The form of the invention shown in Fig. 3 differs from the form shown in Fig. 1 in only two respects; it avoids the use of the second path of flow B for conducting cooled air in heat exchange relation to the cooled air of the path of flow A, and it provides means for conducting the cooled air from the compartment 23a in heat exchange relation to the air moving through the path of flow A'. In view of this, the parts which have been identified and described with relation to Fig. 1, are identified in Fig. 3 by the same numerals as employed in Fig. 1. A heat exchanger 18' is inserted in the system so that air moving from the centrifugal compressor 12 through the duct 15 to the work extraction engine 16 will be conducted through one of the passes of the heat exchanger 18', the other of the passes of the heat exchanger 18' being connected by a duct 36 with the outlet of the compartment 23a, so that cooled air which has performed its useful functions in the compartment 23a will be in the heat exchanger 18' conducted in heat exchange relation to the air which travels from the evaporative cooler through the duct 15 to the work extraction engine 16. The outlet duct 17 of the heat extraction engine 16 is connected to the inlet of the compartment 23a, so that the cooled air of the path of flow A' is carried directly from the heat extraction engine 16 to the receiver, represented by the compartment 23a, in which the air is to be utilized either as atmosphere for a human-occupied cabin or as a cooling medium or source of oxygen for instrumentalities in the compartment 23a.

I claim as my invention:

1. A cooling system for use in a high speed aerial vehicle of the general character described, comprising: means establishing a path of flow of gaseous medium from a source of pressure to a point of ultimate disposition; work extraction means in said path of flow to cool the gaseous medium; evaporative cooling means in said path of flow for cooling the gaseous medium, said cooling means being characterized by having a substance which, by its evaporation, produces a cooling action; means driven by said work extraction means for absorbing the power generated by said work extraction means; a second evaporative cooling means; and means for conducting a fluid stream in heat exchange relation to said second evaporative cooling means and to the gaseous medium in said path of flow.

2. In a cooling system for high speed aerial vehicles: air compressing means; duct means to convey air from said air compressing means to a point of ultimate disposition; a turbine in said duct means to cool said air; an evaporative cooler in said duct means between said air compressing means and said turbine to cool the air prior to its passage through said turbine, said evaporative cooler comprising heat conductive walls forming a path of flow for said air and means forming a chamber to hold a body of liquid in heat exchange relation to said walls so that the liquid, by boiling, will cool the air passing through said evaporative cooler, said chamber having a vapor outlet; a booster compressor in said duct means between said turbine and said air compressing means, connected to said turbine so as to be driven thereby; a heat exchanger in said duct means downstream from said turbine; and means for passing a fluid stream through said heat exchanger in heat exchange relation to the air flowing therein.

3. In a cooling system for high speed aerial vehicles: air compressing means; duct means to convey air from said air compressing means to a point of ultimate disposition; a turbine in said duct means to cool said air; an evaporative cooler in said duct means between said air compressing means and said turbine to cool the air prior to its passage through said turbine, said evaporative cooler comprising heat conductive walls forming a path of flow for said air and means forming a chamber to hold a body of liquid in heat exchange relation to said walls so that the liquid, by boiling, will cool the air passing through said evaporative cooler, said chamber having a vapor outlet; a booster compressor in said duct means between said turbine and said air compressing means, connected to said turbine so as to be driven thereby; a heat exchanger in said duct means; and means for passing a fluid stream through said head exchanger in heat exchange relation to the air flowing therein.

4. In a cooling system for high speed aerial vehicles: air compressing means; duct means to convey air from said air compressing means to a point of ultimate disposition; a turbine in said duct means to cool said air; an evaporative cooler in said duct means between said air compressing means and said turbine to cool the air prior to its passage through said turbine, said evaporative cooler comprising heat conductive walls forming a path of flow for said air and means forming a chamber to hold a body of liquid in heat exchange relation to said walls so that the liquid, by boiling, will cool the air passing through said evaporative cooler, said chamber having a vapor outlet; a booster compressor in said duct means connected to said turbine so as to be driven thereby; a heat exchanger in said duct means downstream from said turbine; and means for passing a fluid stream through said heat exchanger in heat exchange relation to the air flowing therein.

5. In a cooling system for high speed aerial vehicles; air compressing means; duct means to convey air from said air compressing means to a point of ultimate disposition; a turbine in said duct means to cool said air; an evaporative cooler in said duct means between said air compressing means and said turbine to cool the air prior to its passage through said turbine, said evaporative cooler comprising heat conductive walls forming a path of flow for said air and means forming a chamber to hold a body of liquid in heat exchange relation to said walls so that the liquid, by boiling, will cool the air passing through said evaporative cooler, said chamber having a vapor outlet; a booster compressor in said duct means connected to said turbine so as to be driven thereby; a heat exchanger in said duct means; and means for passing a fluid stream through said heat exchanger in heat exchange relation to the air flowing therein.

6. In a cooling system for high speed aerial vehicles: air compressing means; duct means to convey air from said air compressing means to a point of ultimate disposition; a turbine in said duct means to cool said air; an evaporative cooler in said duct means between said air compressing means and said turbine to cool the air prior to its passage through said turbine, said evaporative cooler comprising heat conductive walls forming a path of flow for said air and means forming a chamber to hold a body of liquid in heat exchange relation to said walls so that the liquid, by boiling, will cool the air passing through said evaporative cooler, said chamber having a vapor outlet; and a booster compressor in said duct means between said turbine and said air compressing means, connected to said turbine so as to be driven thereby.

7. In a cooling system for high speed aerial vehicles: air compressing means; duct means to convey air from said air compressing means to a point of ultimate disposition; a turbine in said duct means to cool said air; an evaporative cooler in said duct means between said air compressing means and said turbine to cool the air prior to its passage through said turbine, said evaporative cooler comprising heat conductive walls forming a path of flow for said air and means forming a chamber to hold a body of liquid in heat exchange relation to said walls so that the liquid, by boiling, will cool the air passing through said evaporative cooler, said chamber having a vapor outlet; and a booster compressor in said duct means connected to said turbine so as to be driven thereby.

LEIGHTON S. KING.

REFERENCES CITED

The following references are of record in the file of this patent:

UNITED STATES PATENTS

| Number | Name | Date |
| --- | --- | --- |
| 515,585 | Hill | Feb. 27, 1894 |
| 2,124,289 | Ericson | July 19, 1938 |
| 2,126,266 | Laird | Aug. 9, 1938 |
| 2,175,162 | Waterfill | Oct. 3, 1939 |
| 2,304,151 | Crawford | Dec. 8, 1942 |
| 2,391,838 | Kleinhans | Dec. 25, 1945 |
| 2,453,923 | Mayo | Nov. 16, 1948 |